United States Patent [19]

Saikalis et al.

[11] Patent Number: 5,353,765
[45] Date of Patent: Oct. 11, 1994

[54] FUEL MANAGEMENT SYSTEM FOR A GASEOUS FUEL INTERNAL COMBUSTION ENGINE

[75] Inventors: George Saikalis, West Bloomfield; Masatoshi Sugiura, Novi, both of Mich.

[73] Assignee: Hitachi America, Ltd., Research and Development Division, Tarrytown, N.Y.

[21] Appl. No.: 58,373

[22] Filed: May 10, 1993

[51] Int. Cl.⁵ .................. F02M 7/00; F02M 21/04
[52] U.S. Cl. ....................... 123/438; 123/527; 123/478
[58] Field of Search ....... 123/527, 357, 497, DIG. 12, 123/438, 478; 73/23.32

[56] References Cited

U.S. PATENT DOCUMENTS

| | | | |
|---|---|---|---|
| 3,933,135 | 1/1976 | Zillman et al. | 123/478 |
| 4,372,278 | 2/1983 | Smith | 123/478 |
| 4,865,001 | 9/1989 | Jensen | 123/27 GE |
| 5,085,576 | 2/1992 | Bonne et al. | 431/22 |
| 5,140,959 | 8/1992 | Durbin | 123/527 |
| 5,150,690 | 9/1992 | Carter et al. | 123/527 |
| 5,203,305 | 4/1993 | Porter et al. | 123/527 |
| 5,237,981 | 8/1993 | Polletta et al. | 123/527 |
| 5,251,602 | 10/1993 | Kurihara et al. | 123/527 |

*Primary Examiner*—E. Rollins Cross
*Assistant Examiner*—Erick Solis
*Attorney, Agent, or Firm*—Gifford, Groh, Sprinkle, Patmore and Anderson

[57] ABSTRACT

A fuel management system is provided for use with an internal combustion engine which utilizes gaseous fuel as the fuel source. A mass gas flow sensor is fluidly connected between the gaseous fuel source and the engine. A mass air flow meter is similarly provided in series with an air intake for the internal combustion engine and the outputs from both flow meters are provided as input signals to a microprocessor based control circuit. The control circuit calculates the air/fuel ratio of the combustible charge provided to the engine and generates appropriate output signals to a valve arrangement in series between the source of gaseous fuel and the internal combustion engine to vary the air/fuel ratio to obtain a desired engine performance as a function of the engine operating condition. An air/fuel ratio sensor is also in fluid communication with the exhaust gas stream from the engine and provides an output signal representative of the actual air/fuel ratio to the control circuit. The control circuit compares the signal from the air/fuel ratio sensor with the calculated air/fuel ratio from the gas flow sensor such as a mass gas flow sensor, and provides appropriate compensation signals to the valve arrangement to compensate for variances between the calculated and actual air/fuel ratio.

15 Claims, 5 Drawing Sheets

FUEL MANAGEMENT SYSTEM FOR A GASEOUS FUEL INTERNAL COMBUSTION ENGINE

BACKGROUND OF THE INVENTION

I. Field of the Invention

The present invention relates generally to fuel management systems for internal combustion engines and, more particularly, to such a fuel management system for use with an internal combustion engine utilizing a gaseous fuel as the fuel source.

II. Description of the Prior Art

In order to obtain optimum engine operation, modern day internal combustion engines of the type, for example, used in automotive vehicles, monitor the air/fuel ratio of the fuel charge to the engine and modify the air/fuel ratio to obtain desired engine performance. Careful monitoring of the air/fuel ratio is necessary to obtain best fuel economy, low engine emission and the like.

There is also a modern trend at employing gaseous fuels as the engine fuel. Such gaseous fuels include compressed natural gas (CNG), liquid natural gas (LNG) and liquid petroleum gas (LPG). The advantages of utilizing a gaseous fuel include lower emissions and cleaner combustion, better cold starting for the engine and less expensive fuels due to their abundant availability.

In order to monitor the air/fuel ratio for a gaseous fuel internal combustion engine typically an air/fuel ratio sensor, commonly known as an air/fuel ratio or oxygen sensor, is exposed to the exhaust gas stream ti-om the engine. The air/fuel ratio sensor provides an output signal to a control circuit indicative of the amount of oxygen in the exhaust gas stream, The amount of oxygen in the exhaust gas stream in turn is representative of the air/fuel ratio of the fuel charge to the engine.

One disadvantage of utilizing an air/fuel ratio sensor in the exhaust gas stream for the internal combustion engine is that the air/fuel ratio sensor is only capable of providing a feedback signal to the control system indicative of the air/fuel ratio. Consequently, the delay imposed between the engine combustion and the time in which the air/fuel ratio sensor determines the oxygen content in the exhaust gas stream and provides its signal to a control circuit results in less than optimum engine operating conditions, especially during changing engine operating conditions.

SUMMARY OF THE PRESENT INVENTION

The present invention provides a fuel management system for a gaseous fuel internal combustion engine which overcomes all of the above mentioned disadvantages of the previously known devices.

In brief, the present invention provides a gas flow sensor such as a mass gas flow sensor, in series between the source of gaseous fuel and the internal combustion engine. This mass gas flow sensor provides an output signal to a control circuit indicative of the rate of mass of gaseous fuel provided to the engine.

Similarly, a mass air flow sensor is provided in series with the engine intake for the engine. This mass air flow sensor also provides a signal to the control circuit indicative of the rate of mass of air inducted into the engine.

The control circuit is preferably microprocessor based and includes an algorithm for calculating an air/fuel ratio from the signals received from both the mass air flow sensor and the mass gas flow sensor. The control circuit then generates output signals to a valve or injector(s) means connected in series with the gaseous fuel source in order to vary the amount of gaseous fuel provided to the engine to obtain an optimum air/fuel ratio.

Preferably, an air/fuel ratio sensor is provided in communication with the exhaust gas stream from the engine and generates an output signal to the control circuit representative of the actual air/fuel ratio of the fuel charge provided to the engine. The control circuit compares the actual air/fuel ratio as determined from the air/fuel ratio sensor with the calculated air/fuel ratio and, when necessary, generates appropriate compensation signals to the valve means such that the calculated and actual air/fuel ratio values are substantially identical to each other.

Preferably, the mass gas flow sensor comprises a hot wire mass gas flow sensor. A safety circuit is included with the mass gas flow sensor to maintain the temperature of the hot wire less than the combustion temperature of the gaseous fuel.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
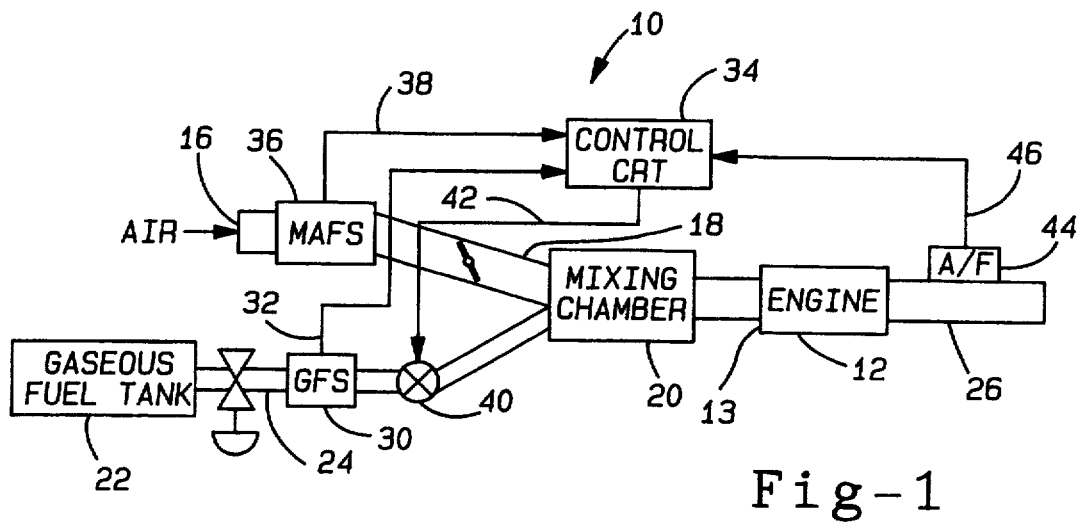
FIG. 1 is a diagrammatic view illustrating a preferred embodiment of the present invention.

With reference first to FIG. 1, a block diagrammatic view of the fuel management system 10 of the present invention is thereshown for use with an internal combustion engine 12 having an intake 13. An air intake 16 is fluidly connected by air flow means 18 to a mixing chamber 20 fluidly connected to the intake engine 13. Similarly, a source of gaseous fuel 22 is fluidly connected by gas flow means 24 to the mixing chamber 20. Consequently, in operation, the air from the air intake 16 and gaseous fuel from the source 22 are mixed in the mixing chamber 20 prior to their induction and combustion in the engine 12. The engine 12 then exhausts the produces from the engine combustion through its exhaust 26.

Different gaseous fuels can be contained within the fuel source 22. For example, the fuel source 22 can contain compressed natural gas (CNG), liquid natural gas (LNG), liquid petroleum gas (LPG) or the like.

Still referring to FIG. 1, a mass gas flow sensor 30, which will be subsequently described in greater detail, is provided in series with the gas flow means 24 between the gas source 22 and the mixing chamber 20. The mass gas flow sensor 30 provides a signal on its output 32 to a control circuit 34 indicative of the mass of gas flow through the flow sensor 30 and thus to the engine 12. Similarly, a mass air flow sensor 36 is fluidly connected in series with the air flow means 18 between the air intake 16 and the mixing chamber 20. This mass air flow sensor 36 provides a signal on its output 38 to the control circuit 34 indicative of the mass air flow to the mixing chamber 20 and thus to the engine 12.

A control valve means 40 is also connected in series with the gas flow means 24 to variably control the rate of gas flow from the fuel source 22 to the mixing chamber 20. The control circuit 34 includes an output 42 electrically connected with the variable valve means 40 to vary the flow rate of gas from the fuel source 22 to the mixing chamber 20 in order to obtain optimum engine performance.

Still referring to FIG. 1, an air/fuel sensor 44 is in fluid communication with the exhaust gas stream from the engine 12. The air/fuel sensor 44 provides a signal on its output 46 to the control circuit 34 indicative of the actual air/fuel ratio in the exhaust gas stream 26 from the engine 12. The purpose of the air/fuel sensor 44 will be subsequently described.

Figure 2:
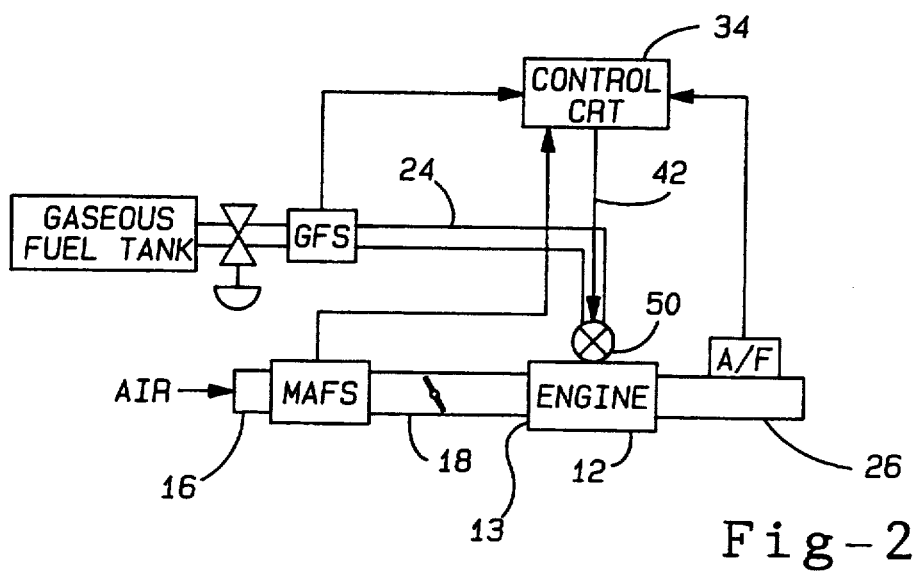
FIG. 2 is a view similar to FIG. 1 but illustrating a modification thereof.

With reference now to FIG. 2, a modification of the fuel management system 10 of the present invention is thereshown. In the FIG. 2 embodiment, the mixing chamber 20 is eliminated and, instead, the air flow means 18 is directly connected to the intake 13 of the engine 12. In addition, a variable valve or gaseous fuel injector 50 is connected in series with the gas flow means 24 to variably control the amount of gaseous fuel to the engine 12. Preferably, one valve 50 is associated with each combustion chamber of the engine. As before, the output 42 from the control circuit 34 variably controls the opening of the valve or injector 50 and thus the amount of fuel provided to the engine 12. In all other respects, the system of FIG. 2 is the same as FIG. 1 and, for brevity, will not be repeated.

Figure 3:
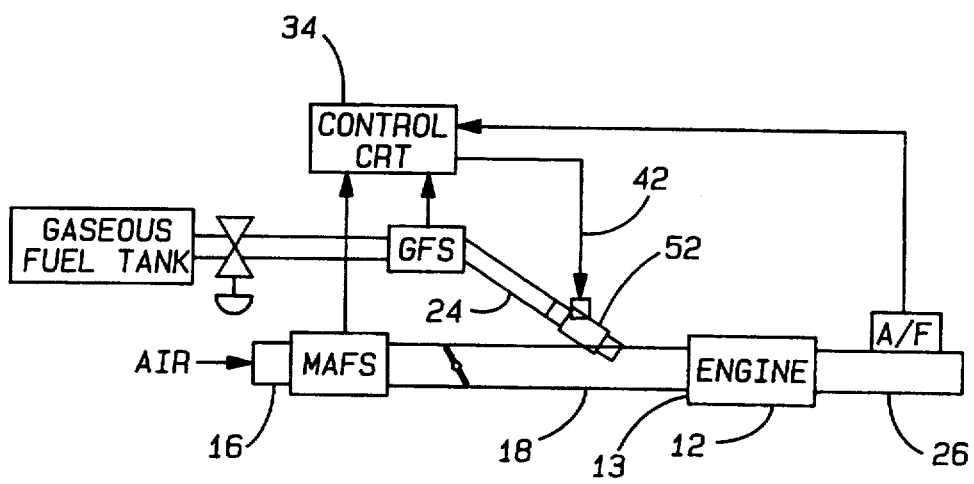
FIG. 3 is a view similar to FIG. 1 and illustrating yet another modification thereof.

With reference now to FIG. 3, a further modification of the present invention is thereshown in which a variable gas fuel injector 52 replaces the valve 50 and is fluidly connected in series with the gas flow means 24. The gas injector 52 is connected with the air flow means 18 immediately upstream from the intake 13 of the engine 12. Consequently, the gas from the injector 52 intermixes with the air inducted through the intake 16 prior to its induction into the engine intake 13. As before, the output 42 from the control circuit 34 controls the operation of the injector 52 to vary the amount of fuel provided to the engine 12.

Figure 4:
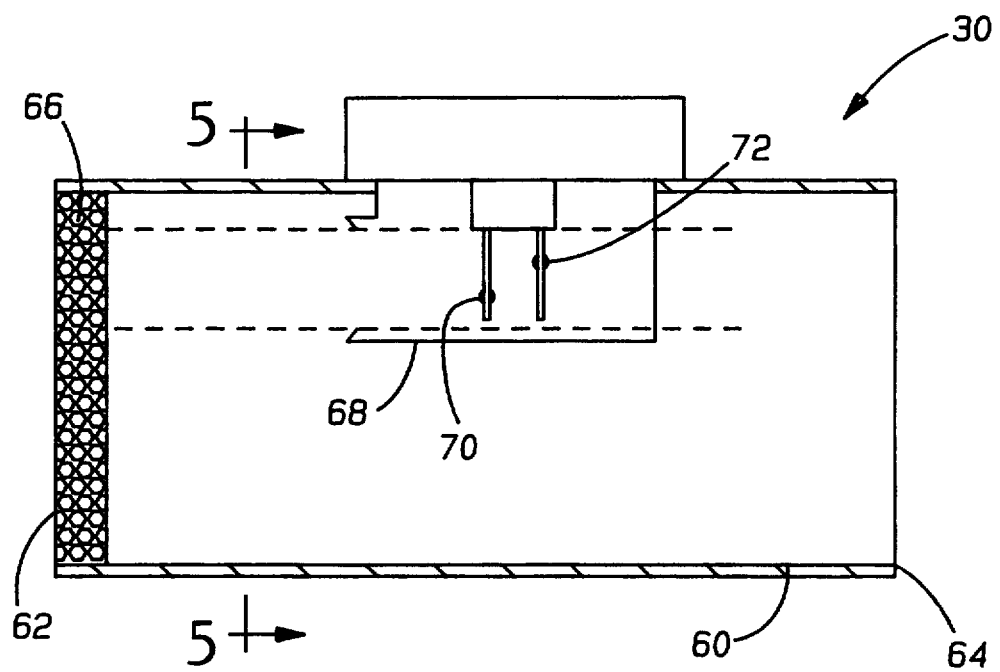
FIG. 4 is a longitudinal sectional view illustrating a preferred embodiment of the mass gas flow sensor.
Figure 5:
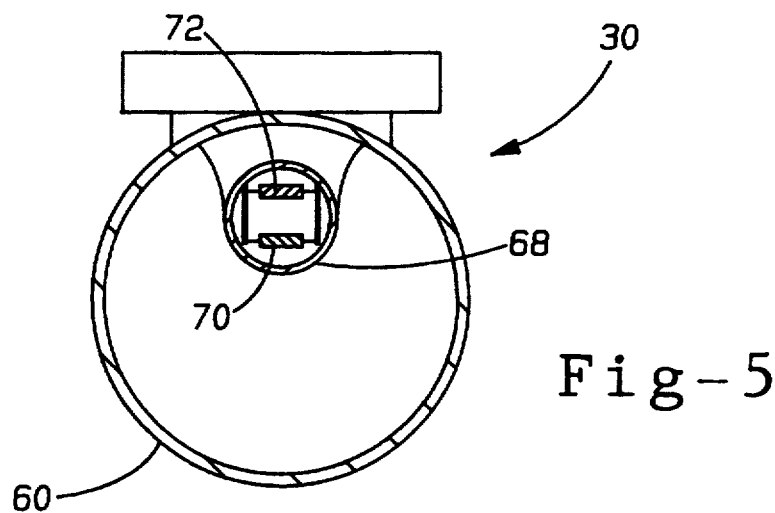
FIG. 5 is a view taken substantially along 5—5 in FIG. 4.

With reference now to FIGS. 4 and 5, a preferred embodiment of the mass gas flow sensor 30 is thereshown and comprises an elongated tubular and cylindrical housing 60 having an inlet end 62 and an outlet end 64. Preferably, flow straighteners 66 are provided at the inlet end 62 of the housing 60 to minimize any turbulence through the housing 60.

A bypass tube 68 is contained within the interior of the housing 60 so that the longitudinal axes of the tube 68 and housing 60 are substantially parallel to each other. Consequently, a portion of the flow through the housing 60 also flows through the bypass tube 68.

The gas flow sensor 30 is a hot wire mass gas flow sensor. As such, both a hot wire 70 and a cold wire 72 are disposed within the bypass tube 68 so that both the hot wire 70 and the cold wire 72 are exposed to gas flow through the bypass tube 68. The cold wire 72 provides an output signal indicative of the ambient temperature of the gas flow through the housing 60 while the hot wire 70 is maintained at substantially a constant temperature over ambient temperature. Since greater current flows are required to maintain the hot wire 70 at its elevated temperature at higher gas flow rates, the voltage across the hot wire 70 provides a signal indicative of the mass gas flow through the flow meter 30.

In designing the bypass tube 68, it is preferable to minimize gas turbulence as much as possible. In particular, the optimal diameter to distance ratio between the hot wire sensor and the bypass should be about 1.5. If the ratio is less than 1.0, the probe is too close to the inlet so that the flow is non-laminar. Conversely, if the ratio is more than 2.0, turbulence is created by secondary air hiring the internal walls of the bypass tube 68.

Additionally, the Reynolds number ($R_E$) should be larger than 2,300. The Reynolds number is defined as follows:

$$R_E = \frac{U \times D}{V}$$

where U equals the gas velocity, D is the diameter of the bypass tube 68 and V is the viscosity of the gas used.

Figure 6:
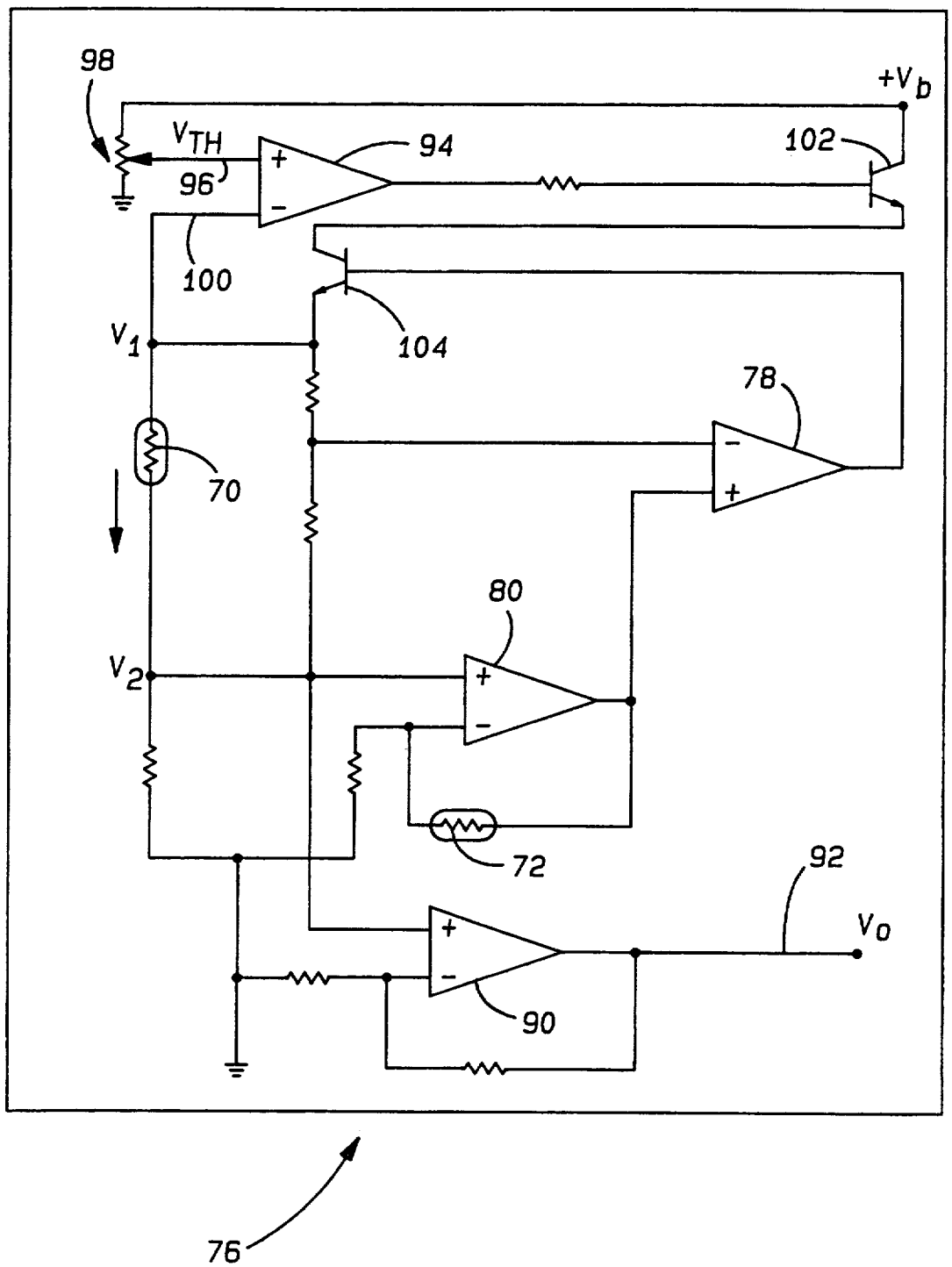
FIG. 6 is a circuit diagram of the electronic portion of the mass gas flow sensor.

With reference now to FIG. 6, an electronic circuit 76 for use with the mass gas flow sensor 30 is thereshown. An electronic circuit 76 includes conventional operational amplifiers 78, 80 and 90 to provide a voltage signal at an output 92 representative of the current flow through the hot wire 70. Such circuitry is standard for a hot wire mass gas flow sensor so that a further description thereof is unnecessary.

Still referring to FIG. 6, however, it is important to maintain the temperature of the hot wire 70 less than the combustible temperature of the gaseous fuel. Otherwise, an explosion can result. For example, since the minimum ignition temperature of gaseous fuel such as methane is around 630° C., a temperature limit of about 550° C. for the hot wire 70 is sufficient to prevent ignition of this gaseous fuel. Furthermore, since the temperature of the hot wire 70 increases with the voltage drop across the hot wire 70, maintaining the voltage drop across the hot wire 70 at less than a preset amount, for example five volts, is sufficient to maintain the hot wire temperature 70 less than the combustion temperature of the fuel.

In order to limit the voltage drop across the hot wire 70, the circuit 76 includes an operational amplifier 94 having one input 96 connected to a biasing voltage through a biasing resistor 98, and a second input 100 connected to the voltage at the hot wire 70. The output from the operational amp 94 is used to control a transistor 102 which, via a second transistor 104, provides current to the hot wire 70.

Consequently, in operation, in the event of a malfunction, whenever the voltage $V_1$ of one side of the hot wire 70 with respect to ground exceeds the threshold value at the input 96 to the operational amplifier 94, the operational amplifier 94 controls the transistor 102 and limits the current to the hot wire 70. In this fashion, the voltage to the hot wire 70 is limited to the threshold value $V_{TH}$ set by the voltage at the input 96 of the operational amplifier 94.

Figure 7:
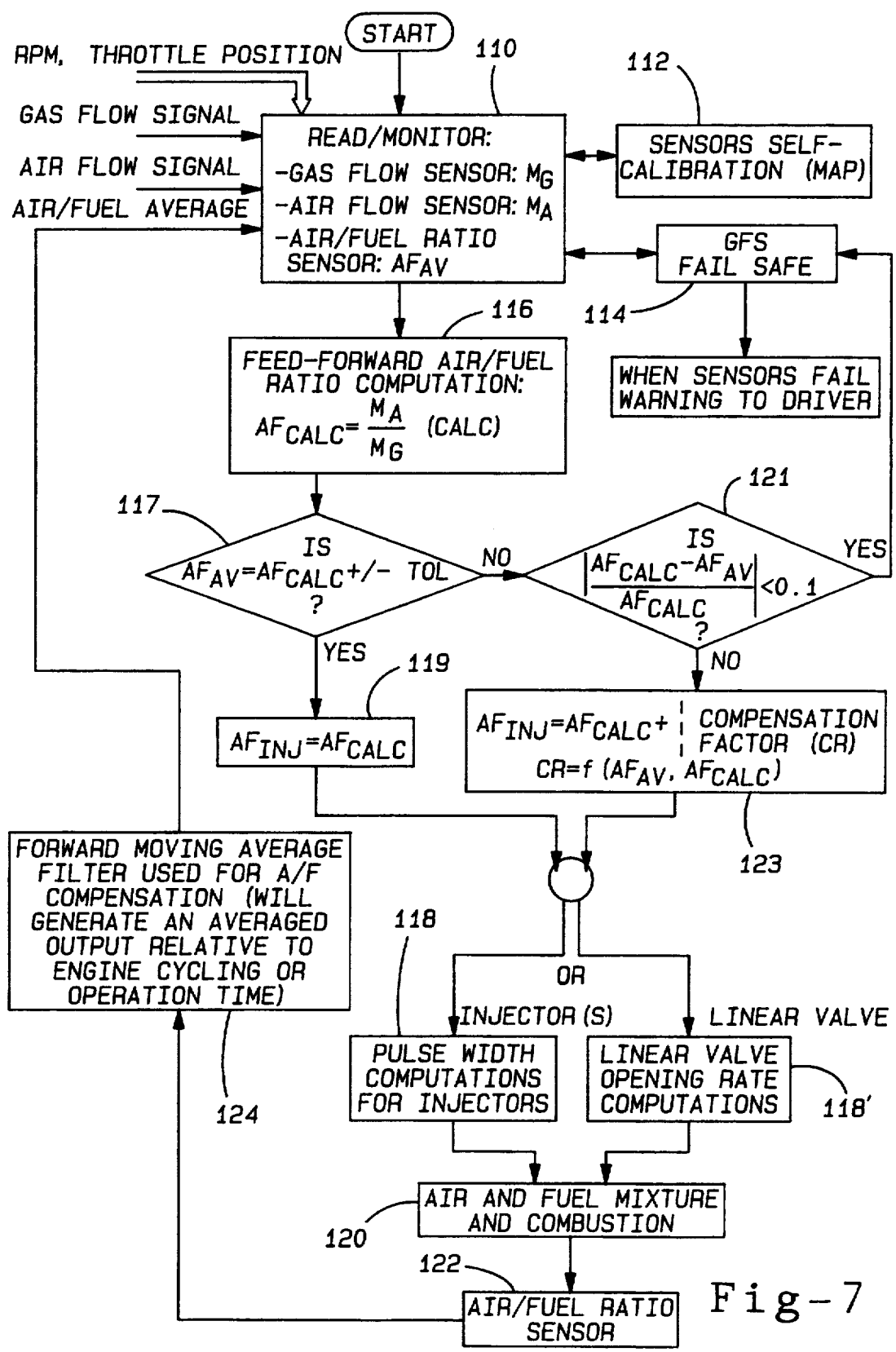
FIG. 7 is a flow chart illustrating the operation of the preferred embodiment of the present invention.

With reference now to FIG. 7, a flow chart illustrating the operation of the fuel management system of the present invention is thereshown. At step 110 the control circuit, which is microprocessor based, reads the gaseous fuel output signal $M_G$ from the mass gas flow sensor 30 and, similarly, the air output signal $M_A$ from the mass air flow sensor 36. Step 110 also retrieves an average value of the actual air/fuel ratio as determined by the air/fuel ratio sensor 44 and assigns this value to $A/F_{AV}$.

Step 110 also iteratively calls a sensor self calibration routine 112 which utilizes an internal table and is conventional in operation so that a further description thereof is unnecessary. Similarly, a sensor diagnostic routine 114 is also iteratively called from step 110. The diagnostic routine will be subsequently described in greater detail.

After step 110 has determined the signals from the sensors 36 and 30, as well as the value $A/F_{AV}$, step 110 branches to step 116 in which the calculated air/fuel ratio is determined by the algorithm in accordance with the following equation:

$$A/F_{CALC} = M_A/M_G.$$

Step 116 then branches to step 117 in which the previously established value $AF_{AV}$ is compared with the calculated value of the air/fuel ratio $AF_{CALC}$ plus or minus a tolerance value TOL. If the value calculated air/fuel ratio is within the value $AF_{CALC} \pm TOL$, step 117 branches to step 119 which assigns the calculated air/fuel ratio $AF_{CALC}$ to the target air/fuel injection value $AF_{INJ}$.

Conversely, if the value of $AF_{AV}$ is not within the calculated air/fuel ratio $AF_{CALC} \pm TOL$, step 117 branches to step 121 which determines if the calculated air/fuel ratio $AF_{CALC}$ is within a predetermined range, e.g. ten percent, of the value $AF_{AV}$. This predetermined range is, of course, greater than the range set by the value TOL in step 117.

If the value of $AF_{CALC}$ is outside the range set by the predetermined range in step 121, step 121 branches to step 114 which performs diagnostics which will be subsequently described.

Conversely, if the value of $AF_{CALC}$ is with the prior value $AF_{AV}$ plus or minus the predetermined range, step 121 branches instead to step 123 which sets the target air/fuel ratio value $AF_{INJ}$ to the calculated air/fuel ratio $AF_{CALC}$ plus a compensation factor CR which is a weighted function of $AF_{AV}$ and $AF_{CALC}$.

In the event that the engine 12 utilizes injection valves, steps 119 or 123 branch to step 118 which sets the duty cycle computations for the fuel injectors needed to obtain the target air/fuel ratio $A/F_{INJ}$. Conversely, if a linear valve is used to control the fuel flow to the engine, steps 119 or 123 instead branch to a step 118' in which the linear valve opening computations are performed to obtain $A/F_{INJ}$. Steps 118 or 118' then branch to step 120 which outputs the appropriate output signal on line 42 to the injectors and/or valves.

Step 120 then branches to step 122 which reads the value from the air/fuel sensor 44. Step 122 then branches to step 124 which calculates the average measured air/fuel ratio $A/F_{AV}$ and then branches to step 110 where the above process is repeated.

Figure 8:
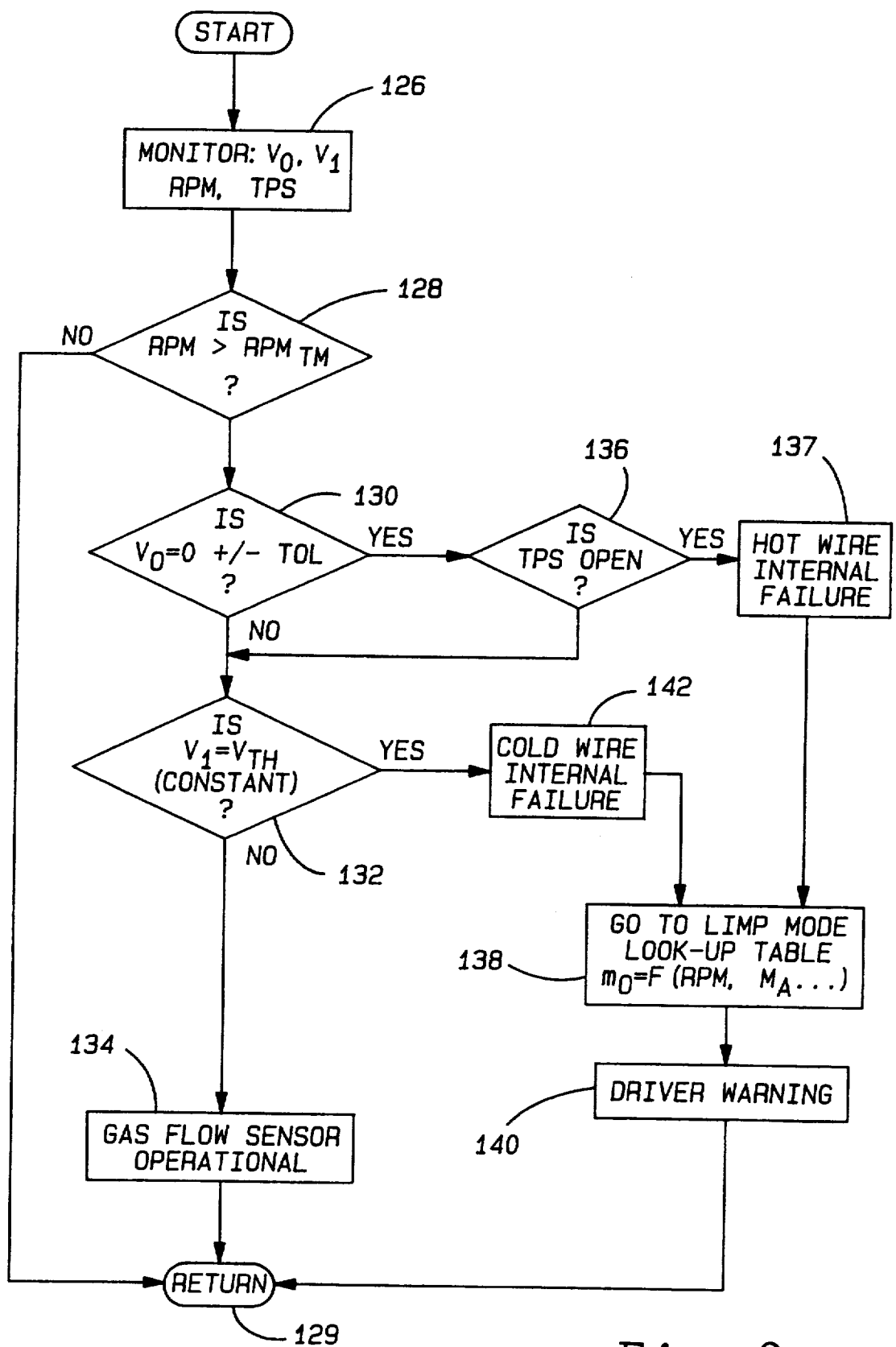
FIG. 8 is a flow chart illustrating a diagnostic routine for the gas flow sensor.

A diagnostic routine for the gas flow sensor 30 is illustrated in FIG. 8. At step 126, the program reads the values of $V_0$, $V_1$, RPM and TPS where $V_0$ equals the output voltage from the output 92 (FIG. 6) of the gas sensor circuit. $V_1$ is the voltage from the hot wire 70 (FIG. 6), RPM is the revolutions per minute of the engine while TPS is a signal from a throttle position sensor. Step 126 then branches to step 128.

At step 128, the algorithm compares the RPM signal with a threshold value $RPM_{TH}$ to determine if the engine is being cranked or already running. If the signal RPM is less than the threshold value $RPM_{TH}$, step 128 branches immediately to step 129 and returns from the diagnostic routine. Otherwise, step 128 branches to step 130.

At step 130, indicative that the engine is already running, the output voltage $V_0$ from the module is compared with zero $\pm$ a tolerance. A value of zero for the voltage $V_0$ would be indicative of a possible malfunction. If the voltage $V_0$ is greater than zero, step 130 branches to step 132. At step 132, the algorithm compares the hot wire voltage $V_1$ with a preset constant value $V_{TH}$ (FIG. 7). If the hot wire voltage $V_1$ is equal to a constant threshold value $V_{TH}$, it would be indicative of a malfunction of the sensor circuit or failure of the cold wire 72. Conversely, if the hot wire voltage $V_1$ is less than its threshold amount, step 132 branches to step 134 indicative of normal operation of the gas flow sensor. Step 134 then branches to step 129 and exits from the diagnostic routine.

At step 130, if the output voltage from the modules is equal to zero, step 130 branches to step 136 which determines if the throttle is open by examining the TPS signal. If not, indicative of deceleration or idle, step 136 branches to step 132. Conversely, if the output voltage $V_0$ from the module is equal to zero and the throttle position is open, a malfunction of the hot wire or other circuitry malfunction is indicated and step 136 branches to step 137. At step 137, a flag is set indicating failure of the hot wire 70 and/or circuit failure and step 137 then branches to step 138. At step 138, the diagnostic routine enters a "limp mode" which allows limited operation of the vehicle to allow the vehicle to reach a service center. Typically, in the limp mode, the microprocessor utilizes data from a look up table, rather than data determined from sensors, to control operation of the vehicle. Step 138 then branches to step 140 to alert the vehicle operator of the malfunction and returns via step 129.

Assuming that the output signal $V_0$ from the module is greater than zero and $V_1$ is equal to a preset constant amount $V_{TH}$, step 132 branches to step 142 which sets a flag indicative that the cold wire has either failed or other internal failure of the circuitry. Step 142 then branches to step 138 where, as before, the engine enters a "limp mode", the driver is warned at step 140 and exits from the diagnostic routine at step 129.

From the foregoing, it can be seen that the present invention provides a novel control system for an internal combustion engine utilizing gaseous fuel as the fuel source. Special provisions are also made for preventing combustion of the gaseous fuel.

Having described my invention, however, many modifications thereto will become apparent to those skilled in the art to which it pertains without deviation from the spirit of the invention as defined by the scope of the appended claims.

I claim:

1. For use in conjunction with an internal combustion engine having an air intake, a source of gaseous fuel, an internal combustion chamber, fuel flow means for fluidly connecting said gaseous fuel source to said combustion chamber, air flow means for fluidly connecting said air intake to the combustion chamber, said gas and said air forming a combustible charge for the combustion chamber and valve means in said fuel flow means for variably controlling the rate of flow of fuel through said fuel flow means, a fuel management system comprising:

means for measuring the mass of gas flow through said fuel flow means and for generating a fuel output signal representative thereof, means for measuring the mass of air flow through said air flow means and for generating an air output signal representative thereof, control circuit means responsive to said fuel output signal and said air output signal for calculating an air/fuel ratio, for comparing said calculated air/fuel ratio with a target air/fuel ratio and for generating an output signal to the valve means to actuate the valve means so that said calculated air/fuel ratio approximates said target air/fuel ratio.

2. The invention as defined in claim 1 wherein said target air/fuel ratio varies as a function of engine operating conditions.

3. The invention as defined in claim 1 wherein said means for measuring the mass of gas flow comprises a hot wire gas flow sensor, said hot wire sensor having a heated wire which is exposed to the gas flow through said fuel flow means.

4. The invention as defined in claim 3 and comprising means for maintaining the temperature of the heated wire below a preset maximum temperature.

5. The invention as defined in claim 4 wherein said maximum temperature is less than the combustion temperature of the gaseous fuel.

6. The invention as defined in claim 4 wherein said temperature maintaining means comprises means for limiting current flow through said heated wire to less than a preset maximum current.

7. The invention as defined in claim 1 and comprising means for measuring the air/fuel ratio of the combustible charge and for generating a measured air/fuel ratio signal representative thereof, means for providing said measured air/fuel ratio signal to said control means, and means for adjusting said calculated air/fuel ratio signal to compensate for differences between said measured air/fuel ratio signal and said calculated air/fuel ratio signal.

8. The invention as defined in claim 7 wherein said means for measuring the air/fuel ratio comprises a sensor in communication with the exhaust gases from the combustion chamber.

9. The invention as defined in claim 8 wherein said sensor comprises an oxygen concentration sensor.

10. The invention as defined in claim 7 wherein said means for adjusting the calculated air/fuel ratio signal to compensate for differences between the calculated air/fuel ratio signal and said measured air/fuel ratio signal comprises assigning a value to the calculated air/fuel ratio signal equal to a weighted average of said calculated air/fuel ratio signal and said measured air/fuel ratio signal.

11. The invention as defined in claim 1 wherein the engine includes a mixing chamber in series with and upstream from the combustion chamber, said fuel flow means and gas flow means extending upstream from and in communication with said mixing chamber.

12. The invention as defined in claim 1 and comprising means for detecting a malfunction of said gas flow sensor and for generating a malfunction signal representative thereof, and means responsive to said malfunction signal for enabling only limited operation of the engine.

13. The invention as defined in claim 12 and comprising means responsive to said malfunction signal for signalling an operator of the engine of the malfunction of the gas flow sensor.

14. The invention as defined in claim 1 wherein said gas is natural gas.

15. The invention as defined in claim 1 wherein said gas is liquid petroleum gas.

* * * * *

REEXAMINATION CERTIFICATE (3160th)
United States Patent [19]
Saikalis et al.

[11] B1 5,353,765
[45] Certificate Issued  Mar. 18, 1997

[54] FUEL MANAGEMENT SYSTEM FOR A GASEOUS FUEL INTERNAL COMBUSTION ENGINE

[75] Inventors: George Saikalis, West Bloomfield; Masatoshi Sugiura, Novi, both of Mich.

[73] Assignee: Hitachi America, Ltd., Tarrytown, N.Y.

Reexamination Request:
No. 90/003,890, Jun. 26, 1995

Reexamination Certificate for:
| | |
|---|---|
| Patent No.: | 5,353,765 |
| Issued: | Oct. 11, 1994 |
| Appl. No.: | 58,373 |
| Filed: | May 10, 1993 |

[51] Int. Cl.$^6$ ............ F02M 7/00; F02M 21/04
[52] U.S. Cl. ............ 123/438; 123/527; 123/478
[58] Field of Search ............ 123/527, 357, 123/497, 438, 478, DIG. 12, 525, 679, 681, 704; 73/23.32, 204, 202.5; 137/9, 101.19

[56] References Cited

U.S. PATENT DOCUMENTS

| | | | |
|---|---|---|---|
| 4,016,759 | 4/1977 | Baker et al. | 73/204 |
| 4,449,401 | 5/1984 | Kaiser et al. | 73/202.5 |
| 4,537,172 | 8/1985 | Kanehara et al. | 123/494 |
| 4,672,997 | 6/1987 | Landis et al. | 73/204 |
| 4,838,295 | 6/1989 | Smith et al. | 137/9 |
| 5,070,850 | 12/1991 | Davis et al. | 123/527 |

*Primary Examiner*—Erick Solis

[57] ABSTRACT

A fuel management system is provided for use with an internal combustion engine which utilizes gaseous fuel as the fuel source. A mass gas flow sensor is fluidly connected between the gaseous fuel source and the engine. A mass air flow meter is similarly provided in series with an air intake for the internal combustion engine and the outputs from both flow meters are provided as input signals to a microprocessor based control circuit. The control circuit calculates the air/fuel ratio of the combustible charge provided to the engine and generates appropriate output signals to a valve arrangement in series between the source of gaseous fuel and the internal combustion engine to vary the air/fuel ratio to obtain a desired engine performance as a function of the engine operating condition. An air/fuel ratio sensor is also in fluid communication with the exhaust gas stream from the engine and provides an output signal representative of the actual air/fuel ratio to the control circuit. The control circuit compares the signal from the air/fuel ratio sensor with the calculated air/fuel ratio from the gas flow sensor such as a mass gas flow sensor, and provides appropriate compensation signals to the valve arrangement to compensate for variances between the calculated and actual air/fuel ratio.

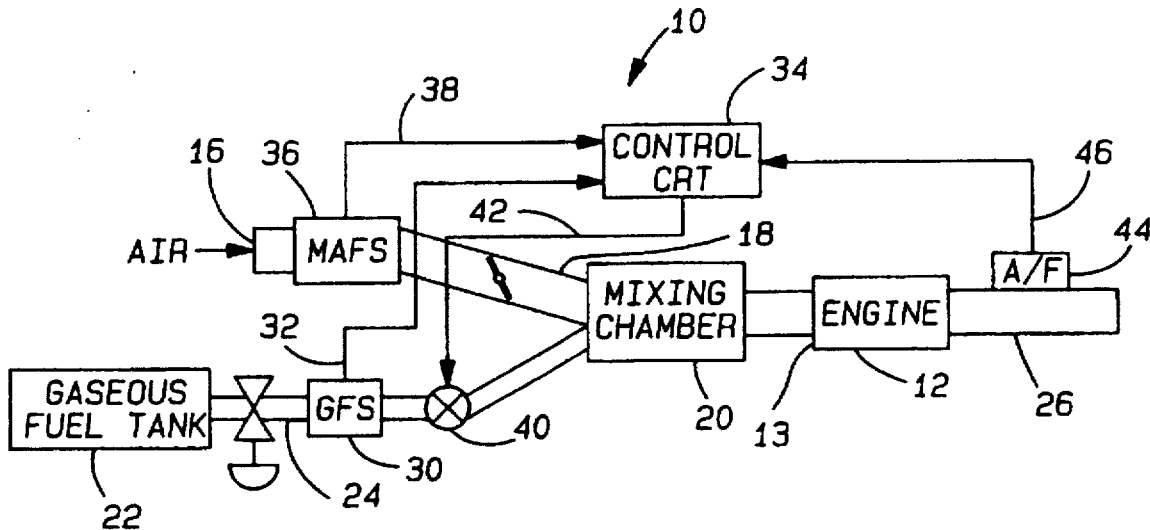

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 7, 8 and 10 are determined to be patentable as amended.

Claims 2, 4–6, 9 and 11–15, dependent on an amended claim, are determined to be patentable.

New claims 16–24 are added and determined to be patentable.

1. For use in conjunction with an internal combustion engine having an air intake, a source of gaseous fuel, an internal combustion chamber, fuel flow means for fluidly connecting said gaseous fuel souce to said combustion chamber, air flow means for fluidly connecting said air intake to the combustion chamber, said gas and said air forming a combustible charge for the combustion chamber and valve means in said fuel flow means for variably controlling the rate of flow of fuel through said fuel flow means, a fuel management system comprising:

means for measuring the mass of gas flow through said fuel flow means and for generating a fuel output signal representative thereof;

means for measuring the mass of air flow through said air flow means and for generating an air output signal representative thereof;

*means for measuring the air/fuel ratio of the combustible charge and for generating a measured air/fuel ratio signal representative thereof;* control circuit means responsive to said fuel output signal and said air output signal for calculating an air/fuel ratio, [for comparing] *said control circuit means further responsive to said measured air/fuel ratio signal, so as to compare* said calculated air/fuel ratio with a target air/fuel ratio *corresponding to said measured air/fuel ratio signal* and for generating an output signal to the valve means to actuate the valve means *based on said calculated air/fuel ratio* so that said calculated air/fuel ratio approximates said target air/fuel ratio within a predetermined tolerance; and

*means for adjusting said calculated air/fuel ratio signal to compensate by a compensation factor for differences between said measured air/fuel ratio signal and said calculated air/fuel ratio signal when said differences exceed said tolerance.*

3. The invention as defined in claim 1 wherein said means for measuring the mass of gas flow comprises a hot wire gas flow sensor and *a cold wire gas flow sensor having a wire exposed to the gas flow through said fuel flow means to indicate the ambient temperature of said gas flow and,* said hot wire sensor having a heated wire which is exposed to the gas flow through said fuel flow means.

7. The invention as defined in claim 1 [and comprising means for measuring the air/fuel ratio of the combustible charge and for generating a measured air/fuel ratio signal representative thereof, means for providing said measured air/fuel ratio signal to said control means, and means for adjusting said calculated air/fuel ratio signal to compensate for differences between said measured air/fuel ratio signal and said calculated air/fuel ratio signal] *further comprising means for providing said measured air/fuel ratio signal to said control means; and a bypass tube contained within said means for measuring the mass of gas flow, wherein a hot wire gas flow sensor and cold wire gas flow sensor are disposed within said bypass tube.*

8. The invention as defined in claim [7] *1* wherein said means for measuring the air/fuel ratio comprises a sensor in communication with the exhaust gases from the combustion chamber.

10. The invention as defined in claim [7] *1* wherein said means for adjusting the calculated air/fuel ratio signal to compensate for differences between the calculated air/fuel ratio signal and said measured air/fuel ratio signal comprises assigning a value to the calculated air/fuel ratio signal equal to a weighted average of said calculated air/fuel ratio signal and said measured air/fuel ratio signal.

*16. The invention as defined in claim 3 further comprising means for maintaining the temperature of the heated wire at a substantially constant temperature over said ambient temperature.*

*17. The invention as defined in claim 1, wherein said means for adjusting is further adapted to compensate for differences between said measured air/fuel ratio signal and said calculated air/fuel ratio signal when said differences exceed said tolerance but fall within a predetermined range, wherein said predetermined range is within about 10% of said calculated air/fuel ratio.*

*18. For use in conjunction with an internal combustion engine having an air intake, a source of gaseous fuel, an internal combustion chamber, fuel flow means for fluidly connecting said gaseous fuel source to said combustion chamber, air flow means for fluidly connecting said air intake to the combustion chamber, said gas and said air forming a combustible charge for the combustion chamber and valve means in said fuel flow means for variably controlling the rate of flow of fuel through said fuel flow means, a fuel management system comprising:*

*means for measuring the mass of air flow through said air flow means and for generating an air output signal representative thereof;*

*a gas flow sensor for measuring the mass of gas flow through said fuel flow means and for generating a fuel output signal representative thereof, said gas flow sensor being defined by a hollow housing, said housing having a gas inlet and a gas outlet, said gas flow sensor further comprises a bypass housing having a diameter smaller than the diameter of said gas flow sensor, wherein a hot wire sensor and a cold wire sensor are adapted to be disposed within said bypass housing, said hot and cold wire sensors further adapted to be exposed to the gas flow through said fuel flow means, such that a voltage signal across said cold wire sensor provides an indication of ambient temperature of said gas flow and said hot wire sensor comprises a heated wire exposed to the gas flow through said fuel flow means; and*

*control circuit means responsive to said fuel output signal and said air output signal for calculating an air/fuel ratio, for comparing said calculated air/fuel ratio with* a target air/fuel ratio and for generating an output signal to the valve means to actuate the valve means so that said calculated air/fuel ratio approximates said target air/fuel ratio.

19. The invention as defined in claim 18, further comprising means for maintaining the temperature of the heated wire at a substantially constant temperature over said ambient temperature.

20. The invention as defined in claim 18, further comprising means for measuring the air/fuel ratio of the combustible charge and for generating a measured air/fuel ratio signal representative thereof, said control circuit means is further responsive to said measured air/fuel ratio signal so as to compare said calculated air/fuel ratio with said target air/fuel ratio corresponding to said measured air/fuel ratio signal, and for generating an output signal to the valve means to actuate the valve means based on said calculated air/fuel ratio signal as long as said calculated air/fuel ratio approximates said target air/fuel ratio within a predetermined tolerance.

21. The invention as defined in claim 20, further comprising means for adjusting said calculated air/fuel ratio signal to compensate for differences between said measured air/fuel ratio signal and said calculated air/fuel ratio signal, when said differences exceed a predetermined range.

22. The invention as defined in claim 21, wherein said means for adjusting the calculated air/fuel ratio signal to compensate for differences between the calculated air/fuel ratio signal comprises assigning a value to the calculated air/fuel ratio signal equal to a weighted average of said calculated air/fuel ratio signal and said measured air/fuel ratio signal.

23. The invention as defined in claim 18, wherein the engine includes a mixing chamber in series with and upstream from the combustion chamber, said fuel flow means and gas flow means extending upstream from and in communications with said mixing chamber.

24. The invention as defined in claim 18 and comprising means for detecting a malfunction of said gas flow sensor and for generating a malfunction signal representative thereof, and means responsive to said malfunction signal for enabling only limited operation of the engine.

* * * * *